United States Patent [19]
Payne

[11] Patent Number: 5,366,024
[45] Date of Patent: Nov. 22, 1994

[54] REMOTELY ADJUSTABLE DEPTH CONTROL

[75] Inventor: David A. Payne, Urbandale, Iowa

[73] Assignee: Deere & Company, Moline, Ill.

[21] Appl. No.: 74,233

[22] Filed: Jun. 9, 1993

[51] Int. Cl.$^5$ .............................................. A01B 63/22
[52] U.S. Cl. .................................... 172/318; 172/413;
172/411; 172/487; 280/43.23
[58] Field of Search ................. 172/318, 78, 238, 240,
172/315, 316, 322, 327, 328, 395, 406, 407,
411–413, 422, 423, 465, 485–487, 583;
280/43.23, 414.5

[56] References Cited

U.S. PATENT DOCUMENTS

| | | | |
|---|---|---|---|
| 3,057,092 | 10/1962 | Carlett | 172/485 |
| 3,700,643 | 10/1971 | Sullivan | 172/411 |
| 4,360,067 | 11/1982 | Sohaaf et al. | 172/413 |
| 4,782,201 | 11/1988 | Pollard et al. | 172/413 |
| 5,277,257 | 1/1994 | Thompson et al. | 172/327 |

OTHER PUBLICATIONS

Deere & Company, Deere Operator Manual, pp. 10-2-0-22, published Jul. 1991.

*Primary Examiner*—Randolph A. Reese
*Assistant Examiner*—Spencer Warnick

[57] ABSTRACT

An implement depth control system includes a rotating link pivotally connected to the frame adjacent the depth control cylinder. A cylinder pin contacts and rotates the link when the implement is lowered toward the field operating position. One end of an adjustable length member is threaded through a turnbuckle mounted on the link and contacts an actuator to limit cylinder retraction and set operating depth. The opposite end of the member extends to an easily accessed location on the implement and includes a crank handle for turning the member and thereby adjusting the length between the turnbuckle and actuator to vary the depth setting. An indicator near the crank handle provides an accurate depth indication at any depth setting, and relative depth adjustments may be made quickly while the implement is in the lowered field working position.

14 Claims, 2 Drawing Sheets

5,366,024

REMOTELY ADJUSTABLE DEPTH CONTROL

BACKGROUND OF THE INVENTION

1) Field of the Invention

The present invention relates generally to agricultural implements with hydraulic depth control, and, more specifically, to an improved depth control adjustment for such an implement.

2) Related Art

Implements such as field cultivators and chisel plows include frames supported for vertical movement by depth control wheels. The depth control wheels are carried on a rockshaft and raised or lowered relative to the frame by a hydraulic cylinder connected between the rockshaft and the frame. Often, a depth control valve is connected between the cylinder and the hydraulic system on the tractor. A linkage connected to the rockshaft operates the valve to maintain a preselected frame height which, in turn, establishes a given working depth for the tools carried by the frame. Current control systems which work off the rockshaft have problems maintaining repeatability, largely because of the slop in the bearing blocks that mount the rockshaft. In addition, depth indications are usually only relative and do not provide a gauge of absolute depth setting.

Various attempts to control depth directly from cylinder extension have often resulted in relatively complex and expensive devices. Chains or other flexible member devices have been used to gauge cylinder extension, but maintaining the flexible member taught under all conditions has been a continuing problem.

Other types devices are available to limit retraction of a cylinder to set working depth, including donut-shaped spacers placed over the cylinder rod or cylinder-mounted valves. However, most of these devices suffer from one or more disadvantages, such as inaccessibility and limited adjustment capability.

BRIEF SUMMARY OF THE INVENTION

It is therefore an object of the present invention to provide an improved depth control system for an implement.

It is a further object of the present invention to provide an improved depth control system for an implement which overcomes the aforementioned problems.

It is another object to provide an improved depth control system which is more accurate and consistent, cycle after cycle, than most previously available rockshaft controlled systems. It is another object to provide such a system which is less sensitive to looseness in the depth control lift structure.

It is a further object to provide an improved depth control system for an implement which relies on cylinder extension rather than rockshaft position.

It is still another object of the present invention to provide an improved depth control system for an implement which is easy to adjust from a convenient location on the implement. It is another object to provide such a system which is more accurate than at least most previously available mechanical systems. It is still a further object to provide such a system which is directly responsive to cylinder extension.

The present depth control system includes a rotating link pivotally connected to the frame adjacent the depth control cylinder. A cylinder pin contacts and rotates the link when the implement is lowered toward the field operating position. One end of an adjustable length member is threaded through a turnbuckle mounted on the link and contacts an actuator to limit cylinder retraction and set operating depth. The opposite end of the member extends to an easily accessed location on the implement and includes a crank handle for turning the member and thereby adjusting the length between the turnbuckle and actuator to vary the depth setting. An indicator near the crank handle provides an accurate depth indication at any depth setting, and relative depth adjustments may be made quickly while the implement is in the lowered field working position. By operating the control directly from the depth control cylinder stroke, inaccuracies and nonrepeatabilities resulting from looseness in the system are minimized.

These and other objects, features and advantages of the present invention will become apparent to one skilled in the art upon reading the following detailed description in view of the drawings.

DETAILED DESCRIPTION OF THE DRAWINGS

Figure 1:
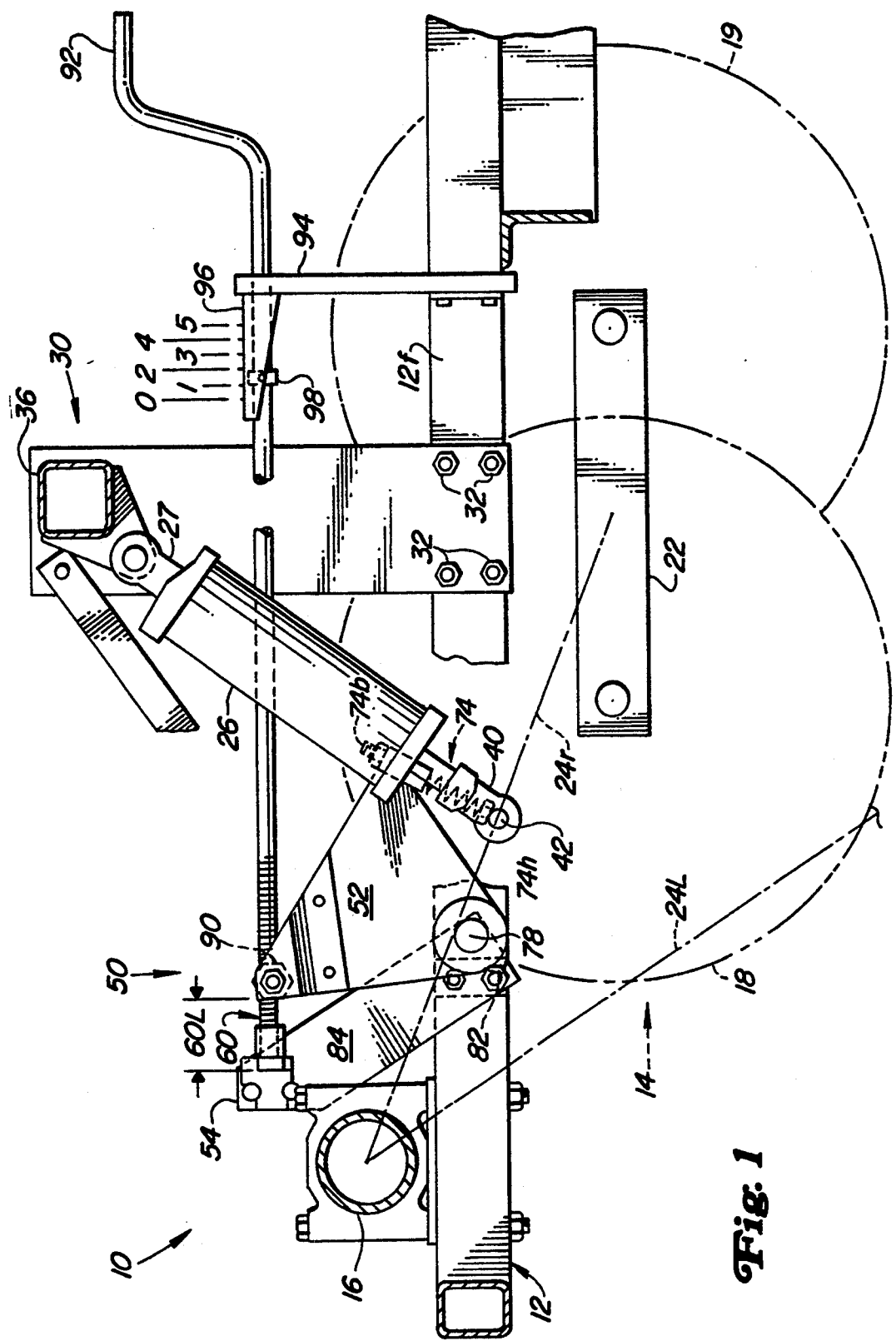
FIG. 1 is a side view of a portion of an implement partially broken away to better show details of the depth control system.

Referring now to FIG. 1, therein is shown a portion of an agricultural implement 10 having a main frame 12 supported above the ground by a vertically adjustable ground engaging lift wheel assembly 14 connected to a rockshaft 16. The wheel assembly 14 includes fore-and-aft spaced wheels 18 and 19 supported from a walking beam 22. The walking beam 22 is pivotally connected to the lower end of a forwardly and downwardly extending lift arm 24. The upper end of the lift arm 24 is fixed to the rockshaft 16 for rotation therewith about a transverse axis between a raised field-working position (24R) and a lowered transport position (24L).

A hydraulic cylinder 26 includes a base end 27 connected to a mast assembly 30. The mast assembly 30 is fixed by bolts 32 to a fore-and-aft extending beam 12f of the main frame 12 and includes a transverse beam 36 extending over the wheel assembly 14 to a similar connection with a second fore-and-aft extending beam (not shown) on the opposite side of the wheel lift arm 24. An apertured bracket 37 pivotally connects the cylinder base end 27 to the beam 36. Rod end 40 of the cylinder 26 is pivotally connected to the central portion of the lift arm 24 by a pin 42 having a transverse extension 42e projecting towards the beam 12f. Retraction of the cylinder 26 lowers the main frame 12 relative to the surface of the ground while extension of the cylinder raises the main frame 12. The implement can be moved between raised transport and lowered field working positions, and the working depth of tools carried by the frame can be adjusted in the field working position.

Figure 2:
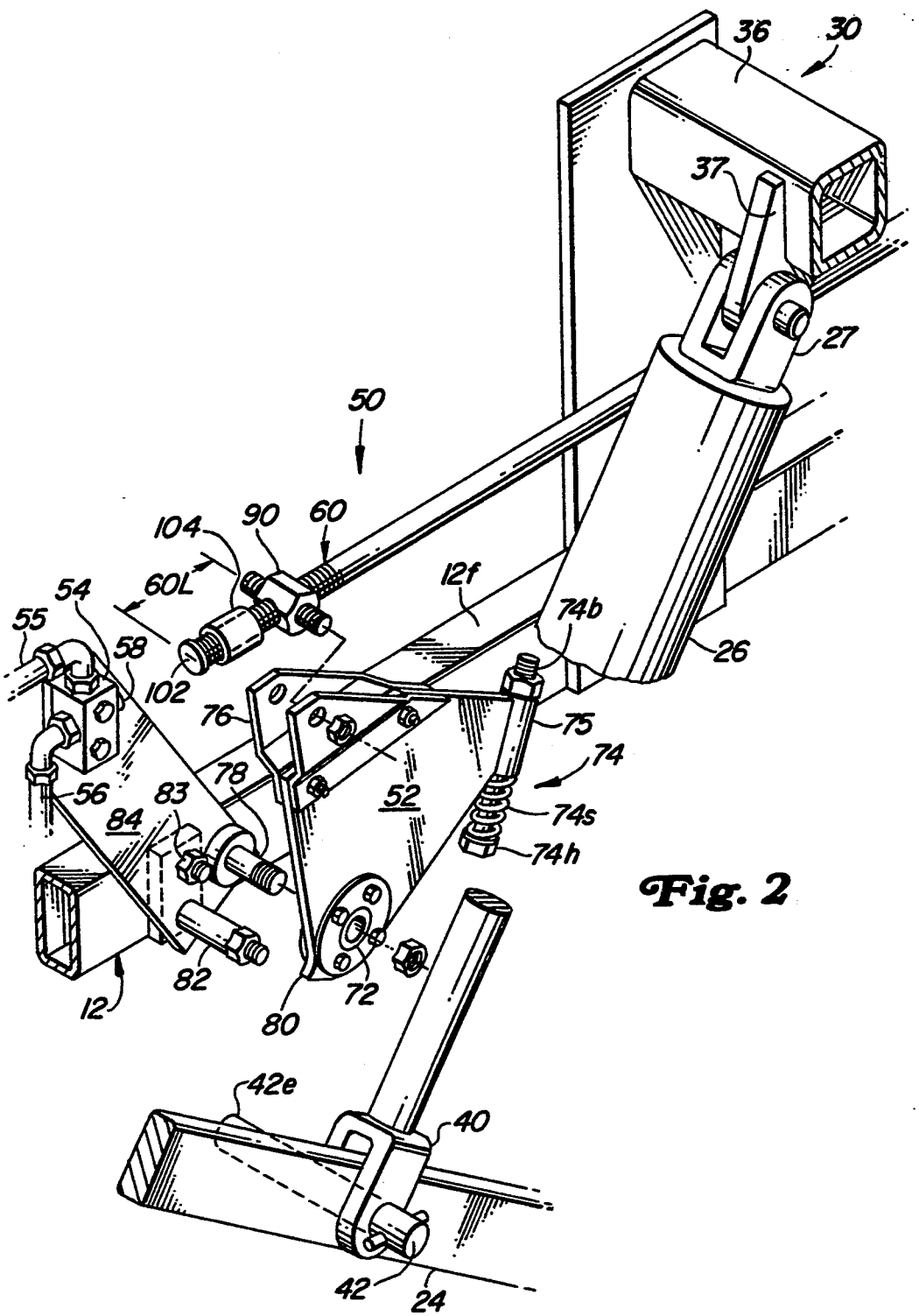
FIG. 2 is an enlarged view of a portion of the depth control system of FIG. 1.

To provide automatic depth control which is dependant directly on cylinder extension and is mechanically adjustable from a conveniently accessed location, a depth control system shown generally at 50 is connected to the frame 12 adjacent the cylinder 26. The depth control system 50 includes a movable or rotatable link 52. As shown in FIG. 2, the link 52 is pivotally connected to the frame 12 adjacent the cylinder 26 and is responsive to the extension of the cylinder 26. A control valve 54 is connected by hydraulic lines 55 and 56 to the cylinder 26 and to a source of hydraulic fluid under pressure on the towing vehicle (not shown) for controlling cylinder extension. The valve 54 includes a poppet 58 located adjacent the link 52. An adjustable operating member 60 is supported from the link 52 and is movable with the link along a path which intercepts the valve poppet 58. The length of the operating member between the link 52 and the poppet 58 (see 60L of FIG. 2) is adjustable from a location remote from the link to provide an adjustable frame operating height directly dependent on cylinder rod extension.

The link 52 as shown in the figures is of triangular plate configuration and supports a pivot bearing 72 near its lowermost corner. A spring loaded contact 74 is mounted within a cylindrical member 75 fixed to the forward corner of the link 52. As shown, the contact 74 includes a bolt 74b having a length substantially greater than that of the member 75. The shank of the bolt 74b is slidably supported within the member 75 and biased downwardly by a spring 74s so that when the link 52 is pivotally mounted from the frame 12, the bolt head 74h lies in the path traversed by the extension 42e. As the cylinder 26 retracts to lower the frame, the extension 42e contacts the head 74h to rotate the link 52 in the counterclockwise direction as viewed in the figures.

A saddle bracket 76 is bolted to the upper corner of the link 52. The bearing 72 is journalled on a shaft 78 supported from the frame 12 so the link 52 pivots about a transversely extending axis parallel to the axis of rotation of the rockshaft 16. A stop 80 projects from the bearing area of the link 52, and a bolt and spacer assembly 82 is supported rearwardly and below the pivot shaft 78 in the path of rotation of the stop 80 to limit forward and downward (clockwise) rotation of the link 52. Preferably, the stop 80 is positioned such that the extension 42e first contacts the bolt head 74h when the cylinder 26 is retracted to a position wherein the frame 12 approaches a depth control range. The spring 74s will compress to allow the bolt 74b to move relative to the link 52 and prevent damage to the components if for any reason the link 52 can no longer freely pivot in the counterclockwise direction.

The bolt and spacer assembly 82 and a second bolt 83 connect a rearwardly and upwardly extending valve mounting bracket 84 to the beam 12f. The control valve 54 is supported from the bracket 84 rearwardly of the axis of the pivot shaft 78 and generally in vertical alignment with the uppermost position of the saddle bracket (FIG. 1). A turnbuckle 90 is pivotally connected to the saddle bracket 76 and is threaded internally to receive the threaded end of the member 60.

The member 60 includes a forward end (FIG. 1) having a crank 92 or other suitable operator end located in an easily accessed location for rotating the member about its longitudinal axis to change the depth control setting. A bracket 94 projects upwardly from the frame 12 and supports the forward end of the member 60. A depth indicator 96 is also supported from the bracket 94 and cooperates with a collar 98 fixed the member 60 to provide an indication of the selected depth setting. The distal end of the member 60 is threaded through the turnbuckle 90 and projects toward the valve poppet 58. A poppet contacting face 102 is fixed to the distal end of the member 60, and a spacer 104 located between the face 102 and the turnbuckle 90 limits the minimum distance 60L that the distal end can be threaded forwardly relative to the turnbuckle 90.

As the link 52 is rotated by the cylinder pin extension 42e upon retraction of the cylinder 26 to lower the frame 12 into a field working position, the member 60 is moved rearwardly by the turnbuckle 90 until the face 102 contacts and depresses the valve poppet 58. Upon depression of the poppet 58, fluid flow from the cylinder 26 is blocked to prevent further retraction of the cylinder. By turning the crank 92, the operating height of the frame 12 may be adjusted. Increasing the length 60L causes the poppet 58 to be contacted at a smaller angular rotation of the link 52 and thus provides shallower working depth corresponding to a larger distance between the frame 12 and the surface of the ground. Decreasing the length 60L provides poppet engagement at a greater angular rotation of the link 52 to provide a deeper working depth. The crank 92 can be rotated to change the distance 60L and thus the working depth of the implement in the depth control range while the implement is in the lowered position. The alignment of the collar 98 with indicia on the depth indicator 96 provides an accurate depth indication when the frame 12 is lowered to the field working position.

Having described the preferred embodiment, it will become apparent that various modifications can be made without departing from the scope of the invention as defined in the accompanying claims.

I claim:

1. In a framed implement having a lift wheel assembly for varying the height of the frame above the ground, the lift assembly including a cylinder with an extendible rod wherein the extension of the rod determines the operating height of the frame, a depth control comprising:

a movable link connected to the frame adjacent the cylinder and responsive to the extension of the rod;

a control valve connected to the cylinder and to a source of hydraulic fluid under pressure for controlling cylinder extension, the valve including an actuator located adjacent the link;

an adjustable operating member supported from the link and movable with the link along a path which intercepts the valve actuator; and means for adjusting the operating member from a location remote from the link to provide an adjustable frame operating height directly dependent on cylinder rod extension.

2. The invention as set forth in claim 1 including a pin connecting the cylinder to the lift wheel assembly, the pin having a link-contacting portion for contacting the link when the framed implement is within a preselected range of heights above the ground.

3. The invention as set forth in claim 1 wherein the means for adjusting the operating member comprises a rod-like member having a threaded end and an operator end, and a turnbuckle connected to the link, and wherein the threaded end projects from the turnbuckle towards the valve actuator.

4. The invention as set forth in claim 1 wherein the link is pivotally connected to the frame, and the cylinder includes an extension projecting into interfering relationship with the link over a portion of the cylinder rod stroke for pivoting the link.

5. The invention as set forth in claim 4 including a stop for limiting the rotation of the link in a direction away from the valve actuator.

6. The invention as set forth in claim 4 wherein the adjustable operating member comprises an adjustable length member supported from the link at a location offset radially from the pivotal axis of the link.

7. In a framed implement adapted for forward movement over the ground and having a hydraulically operated lift assembly for varying the height of the framed implement above the ground, the lift assembly including a cylinder with a base end and an extendible rod with a rod end, wherein an extension of the rod determines an operating height of the framed implement, a depth control comprising:
- a hydraulic control valve supported adjacent the cylinder for controlling the extension of the cylinder;
- a rotatable member pivotally connected to the frame adjacent the cylinder;
- an adjustable valve actuator connected to and movable with the rotatable member and adjustable from a location remote from the actuator for operating the control valve at a rotated position of the member dependant on actuator adjustment; and
- means connected to the cylinder for contacting and rotating the rotatable member to operate the control valve at a preselected extension of the cylinder.

8. The invention as set forth in claim 7 wherein the rotatable member includes a receiving member radially offset from an axis of rotation of the rotatable member, and wherein the adjustable valve actuator includes a crank member having an operator control end and a threaded distal end, and wherein the distal end is threaded through the receiving member and projects towards the valve.

9. The invention as set forth in claim 8 including stop means for limiting contact of the means connected to the cylinder and the rotating member to a preselected portion of the cylinder rod extension.

10. In a framed implement having a cylinder controlled lift for moving the frame to and from a field-working position and adapted for towing forwardly through a field by a towing vehicle having a source of hydraulic fluid under pressure, a system comprising a rotating link pivotally connected to the frame adjacent the cylinder, a contact member connected for movement with the cylinder and movable into contact with the link as the cylinder moves towards the field-working position, a depth control valve supported from the frame adjacent the link and connected between the source and the cylinder, and an adjustable valve operator supported by the link for operating the valve to maintain a preselected cylinder extension dependent upon valve operator adjustment.

11. The invention as set forth in claim 10 wherein the adjustable valve operator comprises a mechanically adjustable variable length member, and means for adjusting the variable length member at a location remote from the valve.

12. The invention as set forth in claim 11 wherein the variable length member comprises a threaded rod having a control end located at a forward location on the implement frame and a distal threaded end, and a turnbuckle mounted on the link and threadably receiving the distal end, wherein the turnbuckle supports the distal end adjacent the control valve.

13. The invention as set forth in claim 11 wherein the variable length member comprises an indicator located at the remote location for providing an indication of the adjustment of the variable length member.

14. The invention as set forth in claim 10 further including stop means for limiting rotation of the link to a preselected range of cylinder extensions.

* * * * *